United States Patent

Viesselmann et al.

[11] Patent Number: 5,931,089
[45] Date of Patent: *Aug. 3, 1999

[54] BALE STARTING CHAMBER WITH TENSIONING DEVICE

[75] Inventors: Kim P. Viesselmann, Graton, Wis.; Willis R. Campbell, Olathe, Kans.

[73] Assignee: Gehl Company, West Bend, Wis.

[*] Notice: This patent issued on a continued prosecution application filed under 37 CFR 1.53(d), and is subject to the twenty year patent term provisions of 35 U.S.C. 154(a)(2).

[21] Appl. No.: 08/812,582

[22] Filed: Mar. 7, 1997

[51] Int. Cl.⁶ ........................................... A01F 15/07
[52] U.S. Cl. ................................................ 100/88; 56/341
[58] Field of Search .................... 100/5, 40, 76, 100/87–89; 56/341

[56] References Cited

U.S. PATENT DOCUMENTS

| | | |
|---|---|---|
| 4,135,352 | 1/1979 | Swenson et al. ........................ 100/88 |
| 4,244,167 | 1/1981 | Seefeld et al. .......................... 100/88 |
| 4,252,057 | 2/1981 | Gaeddert et al. ........................ 100/88 |
| 4,336,750 | 6/1982 | White et al. ............................. 100/88 |
| 4,422,373 | 12/1983 | Gaeddert . |
| 4,510,741 | 4/1985 | Campbell et al. ....................... 100/88 |
| 4,549,480 | 10/1985 | DeCoene .................................. 100/88 |
| 4,782,652 | 11/1988 | White . |
| 4,870,812 | 10/1989 | Jennings et al. ........................ 100/88 |
| 4,899,651 | 2/1990 | Lausch et al. ........................... 100/88 |
| 5,138,942 | 8/1992 | Henderson et al. . |

FOREIGN PATENT DOCUMENTS

2460099  1/1981  France .

*Primary Examiner*—Stephen F. Gerrity
*Attorney, Agent, or Firm*—Andrus, Sceales, Starke & Sawall

[57] ABSTRACT

A round baler for forming round bales of crop material includes side-by-side belts trained for movement between a starting position and a finish position around a series of stationary rollers including a forward baler roller and a rear baler roller spaced apart from the forward baler roller. Upper and lower roller arrangements are continuously engageable with the crop material. The upper roller arrangement, the lower roller arrangement and a run of the belts extending between the forward baler roller and the rear baler roller together define a starting baler chamber. A belt tracking and tensioning device is interposed between the forward baler roller and the rear baler roller. The belt tracking and tensioning device is mounted on the upper roller arrangement, and functions to maintain the belts in a predetermined relationship relative to the upper roller arrangement and to increase the tension of the belts in response to bale growth, as the belts move between the starting position and the finish position.

24 Claims, 4 Drawing Sheets

BALE STARTING CHAMBER WITH TENSIONING DEVICE

FIELD OF THE INVENTION

This invention relates broadly to a baler for forming round bales of agricultural crop material, and more particularly, pertains to a variable chamber round baler having a series of side-by-side belts defining an expandable chamber within which a round bale of crop material is formed.

BACKGROUND AND SUMMARY OF THE INVENTION

Round balers of the open throat design generally include a variably sized, bale forming chamber provided between spaced baler side panels, and defined by a series of side-by-side belts rotatably supported between the side panels. Also included is an upper roller arrangement and a lower roller arrangement which cooperate with one or more runs of the belts to form a bale starting chamber into which crop material is unobstructedly fed by the roller arrangements and a pick-up assembly.

While balers of such construction are preferred because of the wide-open nature of their feeding throats, some designs continue to include independent packing or compressing mechanisms in the vicinity of the bale forming chamber to maintain the tightness of the bale being formed. In addition, open throat round balers are also provided with various tensioning arrangements for ensuring the tautness of the belts throughout the bale formation. Many of these tensioning arrangements continue to be overly complicated using different arrangements of rollers or shafts, arms, springs and the like.

Accordingly, it is an object of the present invention to provide an improved belt-type, round baler which offers the advantages of an open throat configuration without necessity for separate packing or compressing mechanisms. It is a further object of the invention to provide a simplified belt tensioning device which is readily incorporated into the upper roller arrangement forming the bale starting chamber and is automatically actuable to tension the belts as the bale is progressively formed.

In one aspect of the invention, a round baler for forming round bales of crop material includes a plurality of side-by-side belts trained for movement between a starting position and a finish position around a plurality of stationary rollers including a forward baler roller and a rear baler roller spaced apart from the forward baler roller. Upper and lower roller arrangements are continuously engageable with the crop material. A bale starting chamber is defined by the upper roller arrangement, the lower roller arrangement and a run of the belts extending between the forward baler roller and the rear baler roller. A belt tracking and tensioning device is interposed between the forward baler roller and the rear baler roller. The belt tracking and tensioning device functions to vary the tension on the belts during movement of the belts between the starting position and the finished position in response to growth of the bale. The belt tracking and tensioning device is preferably mounted to the upper roller arrangement.

In the preferred embodiment, the upper roller arrangement consists of a stripping roller and an initial bale forming roller located parallel to, beneath and forwardly of the stripping roller. The belt tracking and tensioning device includes bracket structure pivotally mounted to the stripping roller. The bracket structure defines a pair of spaced ends, a first one of which is pivotally mounted to the stripping roller.

The belt tracking and tensioning device further includes at least one guide roller mounted to a second end of the bracket structure. The at least one guide roller is located above and is supported against the belts on the stripping roller by the bracket structure. The belt tracking and tensioning device is located outside the bale starting chamber and is movable in a forward direction in response to bale growth. The belt tracking and tensioning device preferably includes a first guide roller engageable with the belts, and a second guide roller engageable with the belts and spaced from the first guide roller by the bracket structure. The first guide roller and the second guide roller are both located above the upper roller arrangement, and the belts are located between the upper roller arrangement and the first and second guide rollers. The first guide roller functions to maintain the belts in a predetermined relationship relative to the upper roller arrangement during bale growth. The forward pivoting movement of the bracket structure and the first and second guide rollers, caused by engagement of the belts with the first guide roller during bale growth, functions to exert increasing tension on the belts to increase the compressive force exerted on the crop material by the belt, as the bale increases in diameter. The lower roller arrangement is in the form of a single floor roller mounted rearwardly of the upper roller arrangement.

Another aspect of the invention relates to a round baler for forming round bales of crop material having a plurality of side-by-side belts trained about a series of stationary baler rollers for movement between a starting and a finish position. The baler includes an upper roller arrangement and a lower roller arrangement, both of which are engageable with the crop material and cooperable with a run of the belts to define a bale starting chamber. The improvement of the invention resides in a mechanism for maintaining the belts in a predetermined relationship relative to the upper roller arrangement during all phases of bale growth and, preferably, for tensioning the belts between the starting position and finish position. The mechanism includes a bracket pivotably mounted to one of the roller arrangements and at least one guide roller mounted on the bracket and engageable with the belts. The at least one guide roller is shiftable along an arcuate path during bale formation due to pivoting movement of the bracket in response to bale growth to maintain the spacing of the belts relative to the upper roller arrangement while maintaining the operative relationship of the upper roller arrangement relative to the bale forming chamber as the bale grows therein. The mechanism preferably also includes a second guide roller mounted on the bracket in spaced relationship to the first-mentioned guide roller and the second guide roller is also engageable with the belts to increase tension on the belts as the bale grows. The diameters of the first-mentioned and second guide rollers are less than the diameter of the rolls in the roller arrangements.

Yet another aspect of the invention relates to a round baler for forming round bales of crop material and having a plurality of side-by-side belts trained about a series of baler rollers for movement between a starting position and a finish position. The baler includes a driven stripping roller and a driven floor roller, both of which are engageable with the crop material and cooperable with a run of the belts to define a bale starting chamber. The improvement of the invention resides in a mechanism for tensioning the belts between the starting position and finish position, and comprises a bracket pivotably mounted to the stripping roller. A first guide roller is mounted to the bracket and is engageable with the belts, and a second guide roller is mounted to the bracket in spaced relationship from the first guide roller and is also engageable with the belts. The bracket is pivoted relative to the stripping roller during bale formation by engagement of the bale with the first guide roller through the belts, which results in movement of the first and second guide rollers to increase tension on the belts as the bale grows. The bracket preferably has a first leg and a second leg diverging from a common intersection thereon. In a preferred form, the first guide roller is mounted for rotation at the common intersection, the second guide roller is mounted for rotation on the first leg, and the second leg is pivotably mounted to the stripping roller.

Various other objects, features and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
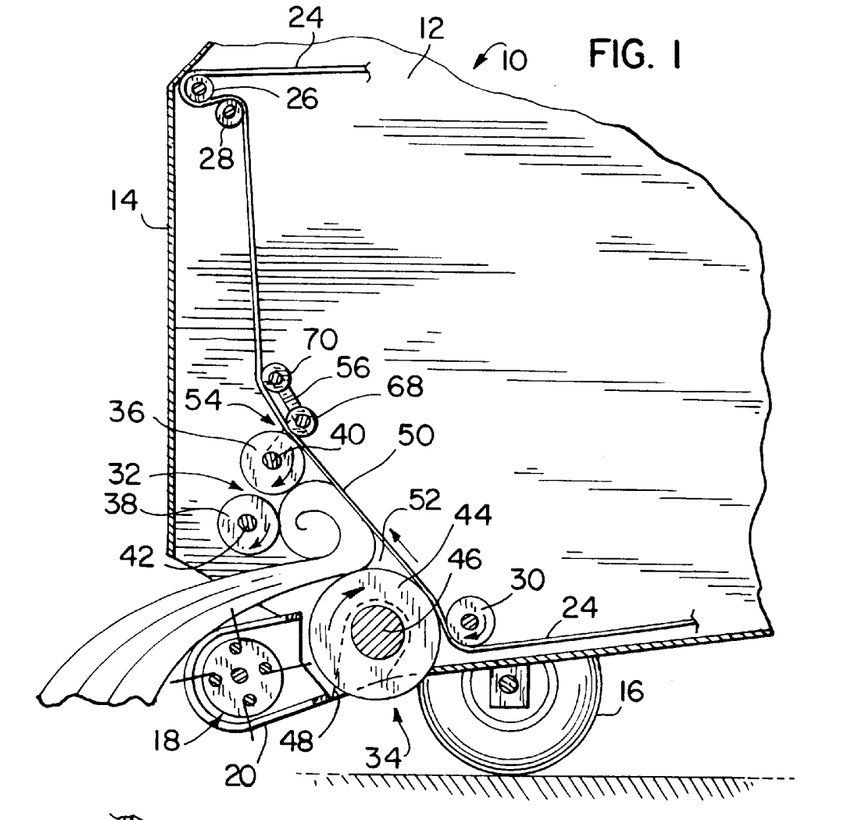
FIG. 1 is a fragmentary, side elevational view of a variable chamber round baler incorporating starting chamber rollers and illustrating the belt tensioning device embodying the present invention.

Referring to FIG. 1, a belt-type, variable chamber baler 10 generally includes a pair of side panels, one of which is shown at 12, spaced from each other and assembled to a frame assembly. Baler 10 has a forward end 14 which is adapted to be pulled behind a tractor (not shown), and is supported by a pair of ground engaging wheels 16, one of which is shown in FIG. 1. A crop pick-up mechanism 18 is rotatably mounted to a support assembly 20 provided on the lower portion of baler 10 for picking up windrowed crop material and feeding it rearwardly toward the crop inlet of baler 10. These components of baler 10 and their operation are all well known.

Figure 3:
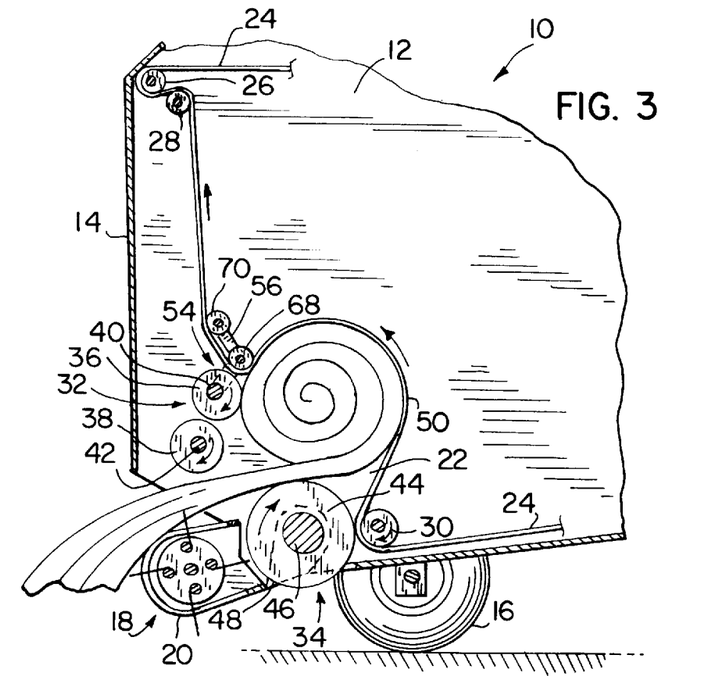
FIG. 3 is a view similar to FIG. 1 showing the belt tensioning device during initial bale formation.

As best seen in FIG. 3, an internal bale-forming chamber 22 is provided between baler side panels 12, and a series of side-by-side baler belts 24 are wrapped around a series of stationary baler rollers rotatably supported between baler side panels 12. The stationary rollers include a drive roller 26 mounted on the upper, forward portion of the baler 10 and driven in response to input power supplied through the tractor power take off mechanism, an upper idler roller 28 and a lower idler roller 30. Although not shown, belts 24 are further entrained about other rollers located between baler side panels 12 so as to present a number of crop-engaging runs which together form a circulatory loop moveable from a bale starting position (FIG. 1) to a bale finish position (FIG. 4) as is well understood. In accordance with known technology, a belt take-up mechanism (not shown) accommodates the belts as bale-forming chamber 22 increases in size between the bale starting and bale finish positions.

Crop material from the crop windrow is fed rearwardly by operation of pick-up mechanism 18 into a crop inlet located between and defined by an upper roller arrangement 32 and a lower roller arrangement 34. Upper roller arrangement 32 comprises a driven stripping roller 36 and a driven initial bale forming roller 38 locating directly beneath, forwardly of and parallel to stripping roller 36. Both stripping roller 36 and initial bale forming roller 38 have similar diameters, and are supported on respective shafts 40, 42 between the side panels 12 for rotational movement in the same direction, preferably clockwise, as shown in FIG. 1.

Lower roller arrangement 34 is constituted by a single driven floor roller 44 which has a diameter larger than stripping roller 36 and initial bale forming roller 38, and which is rotatably supported on a shaft 46 between side panels 12 for rotational movement in the same direction as stripping roller 36 and initial bale forming roller 38. Floor roller 44 is disposed between pick-up mechanism 18 and lower idler roller 30, and is mounted on a support assembly 48 extending upwardly from the bottom of baler 10. Upper and lower roller arrangements 32, 34 cooperate with a run 50 of belts 24 extending between drive roller 26 and lower idler roller 30 to define a bale starting chamber 52. Baler belt run 50 moves in the direction of the arrow shown adjacent thereto, and coacts with pick-up mechanism 18, stripping roller 36, initial bale forming roller 38, and floor roller 44 to rotate the crop material in a counterclockwise fashion and is fed into bale starting chamber 52 to form a core of crop material. As will be appreciated from FIGS. 1, 3 and 4, initial bale forming roller 38 is engageable with the infed crop material only during the initial formation or coiling of the round bale while stripping roller 36 and floor roller 44 are continuously engageable with crop material throughout bale formation.

In accordance with the invention, a belt tracking and tensioning device 54 is interposed between drive roller 26 and lower idler roller 30, and is mounted outside bale starting chamber 52 on upper roller arrangement 32 to vary the tension of belts 24 between the starting position and finish position of belts 24. In a manner to be explained, belt tensioning device 54 functions to increase the compressive force exerted by belts 24 on the bale as the bale grows, resulting in a tightly compacted finished bale.

Figure 2:
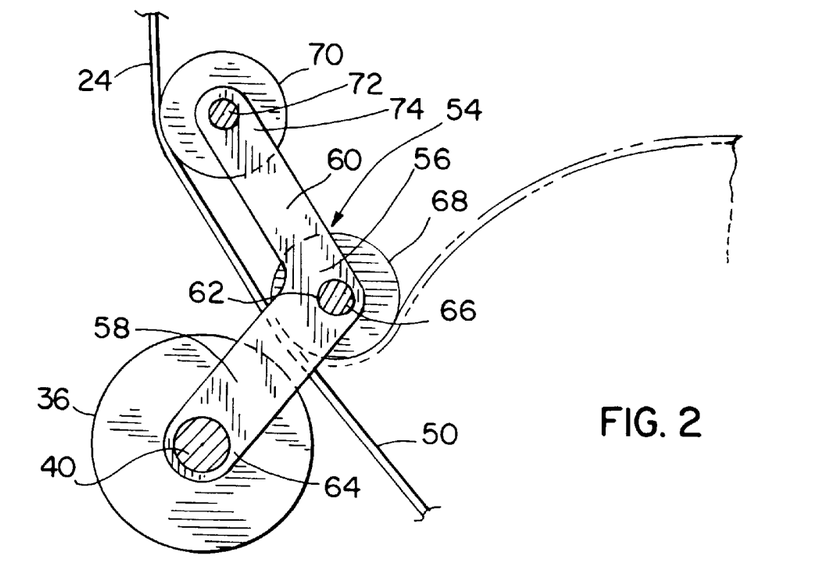
FIG. 2 is an enlarged, detail view of the belt tensioning device shown in FIG. 1.

As best seen in FIG. 2, belt tracking and tensioning device 54 preferably includes a pair of generally V-shaped brackets 56 located one adjacent each side sheet of baler 10 outwardly of belts 24. Each bracket 56 has a pair of legs 58, 60, each of which diverges from a common intersection 62. A free end 64 of first leg 58 of each bracket 56 is pivotably mounted to the shaft 40 of stripping roller 36, which is disposed in spaced relationship but held in close proximity to belts 24 to ensure proper tracking thereof. Mounted for rotation on a shaft 66 at the common intersection 62 of bracket 56 is a first guide roller 68 located above and initially disposed rearwardly of stripping roller 36 for entrainment with belt run 50 which passes between first guide roller 68 and stripping roller 36. A second guide roller 70 is rotatably secured about a shaft 72 on the free end 74 of second leg 60, and is located above both stripping roller 36 and first guide roller 68 at a position spaced forwardly thereof also for entrainment with run 50.

First guide roller 68 and second guide roller 70 are idler rollers solely supported against belts 24 by the pivotal mounting of brackets 56 on stripping roller 36, and have diameters which are smaller than the diameter of stripping roller 36 and initial bale forming roller 38 and generally similar to the diameter of drive roller 26. As seen in FIG. 1, first guide roller 68 and second guide roller 70 in the initial bale forming stage function to change the direction of run 50 from a generally upwardly and forwardly angular orientation to a generally vertical orientation.

At the beginning of the baling cycle, components of the baler are disposed in the condition depicted in FIG. 1. At such time, belt tracking and tensioning device 54 is oriented as described above so that run 50 of belts 24 defines a substantially straight rear wall of bale starting chamber 52. As baler 10 advances along a crop windrow, pick-up mechanism 18 elevates the material from the ground and feeds it through the open throat crop inlet into bale starting chamber 52 whereupon it is engaged by stripping roller 36, initial bale forming roller 38, and floor roller 44, all of which are driven in a clockwise direction, so as to cause the material to cascade forwardly. As additional crop material is introduced into bale starting chamber 52, the cascading material begins to rotate counterclockwise and coil up into a bale, which exerts radially outwardly directed forces against the belt run 50 causing a curved deformation thereof.

Figure 4:
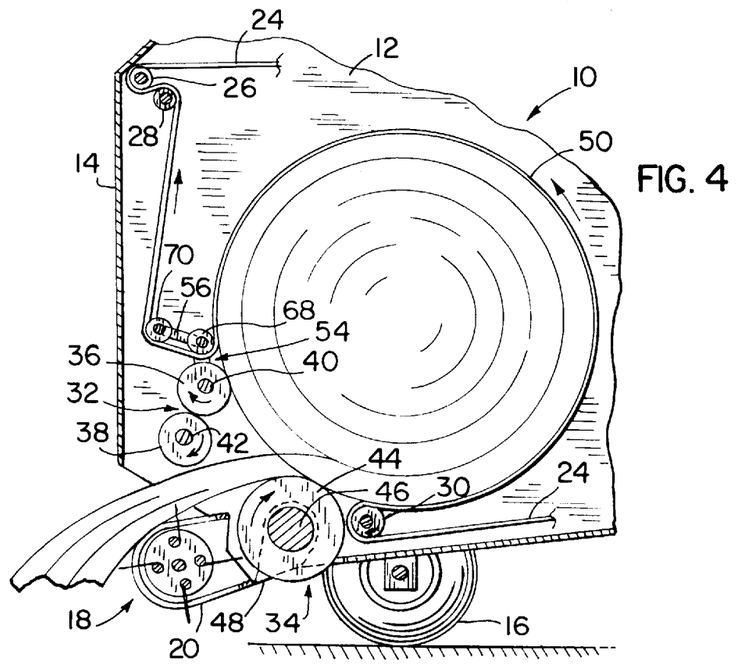
FIG. 4 is a view similar to FIG. 3 showing the belt tensioning device after forming of the bale.

As the bale continues to form, as illustrated in FIG. 3, the bale moves rearwardly within bale forming chamber 22 and becomes disengaged from initial bale forming roller 38. Stripping roller 36 and floor roller 44 continue to rotate clockwise and feed further crop material into expanding bale forming chamber 22 where the bale is rotated by the belts 24. As the bale continues to grow, as shown in FIG. 4, belts 24 increase their contact along the lower curvature of first guide roller 68 and the bale exerts a forwardly directed force on first guide roller 68, which causes bracket 56 to pivot forwardly at its pivotable mounting to shaft 40 of stripping roller 36. This forward pivoting movement of bracket 56 causes progressive forward and downward movement of second guide roller 70, which acts to lengthen the run of belts 24 between upper idler roller 28 and first guide roller 68 as the bale grows. This movement of second guide roller 70 functions to increase the pressure applied to the bale by belts 24 during the final stages of bale growth, to tightly compact the outer portions of the bale prior to its completion. The pressure applied to the bale as bracket 56 pivots forwardly during bale growth functions to increase resistance on the bale, which in turn requires additional effort by the belt in turning the bale within the baling chamber. This functions to increase the tension applied to the bale to compress the bale as the bale grows, due to the pulling force exerted on belts 50 by drive roller 26.

As can be seen by comparing FIGS. 3 and 4, the run of belts 24 between upper idler roller 28 and first guide roller 68 moves from a forwardly angled orientation to a rearwardly angled orientation as the bale grows, due to engagement of second guide roller 70 with belts 24 as it moves downwardly and forwardly during bale growth.

Once the bale is completed and ejected from the rear of baler 10 as is well known, belt tracking and tensioning device 54 automatically returns to its original FIG. 1 position due to the normal tension exerted on belts 24 by the belt take-up mechanism, and belts 24 assume their original orientation.

Figure 5:
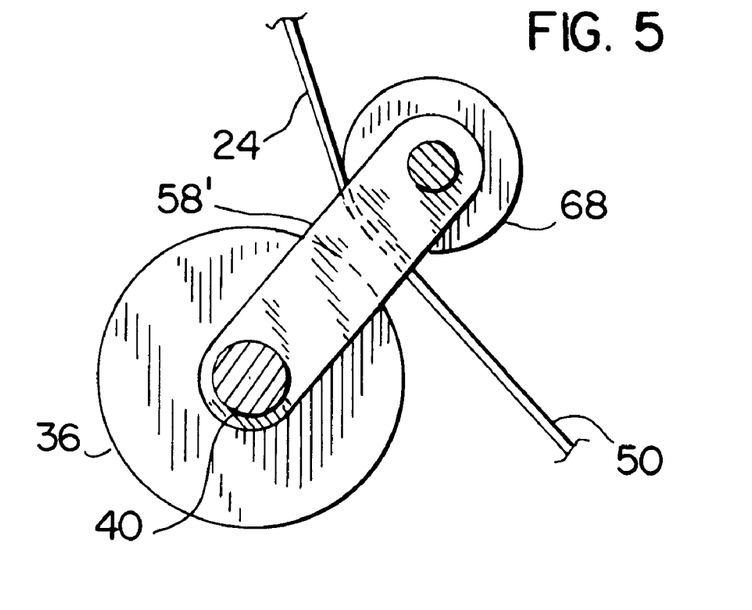
FIGS. 5 and 6 are enlarged detail views similar to FIG. 3 showing an alternate embodiment of the invention in starting and finish positions, respectively.
Figure 6:
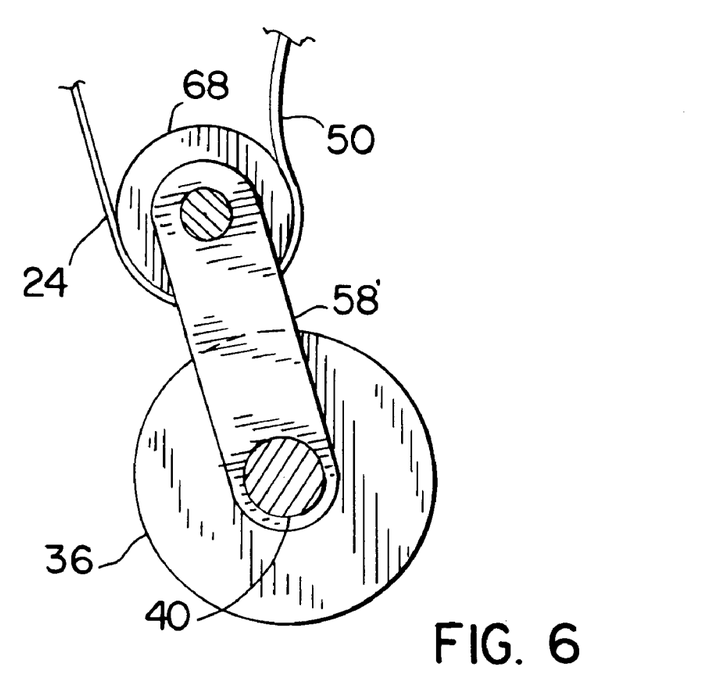

As can be appreciated from the above description, first guide roller 68 functions to maintain belts 24 in a constant predetermined relationship relative to stripping roller 36 while accommodating bale growth, due to pivoting movement of bracket arm 58 upon stripping roller shaft 40. This feature provides movement of first guide roller 68 along an arcuate path during bale growth, to maintain belts 24 in a constant close, predetermined relationship relative to stripping roller 36. As shown in FIGS. 5 and 6, this feature of the invention can be accomplished by eliminating bracket arm 56 and second guide roller 70, utilizing a pair of link members 58' mounted one to each end of stripping roller shaft 40 so as to be pivotable thereabout. First guide roller shaft 66 is mounted to the outer ends of link members 58' and, as in the prior embodiment, first guide roller 68 is rotatably mounted to shaft 66.

With this construction, the alternative embodiment of the invention provides movement of first guide roller 68 through an arcuate path as the bale grows, between a starting position as shown in FIG. 5 and a finished position as shown in FIG. 6, to maintain belts 24 in close engagement with stripping roller 36, to maintain proper functioning of stripping roller 36 during all phases of bale growth. Such movement of first guide roller 68 maintains proper tracking of belts 24 and enables growth of the bale forming chamber without a restriction therein which would otherwise be caused if first guide roller 68 were stationary.

Figure 7:
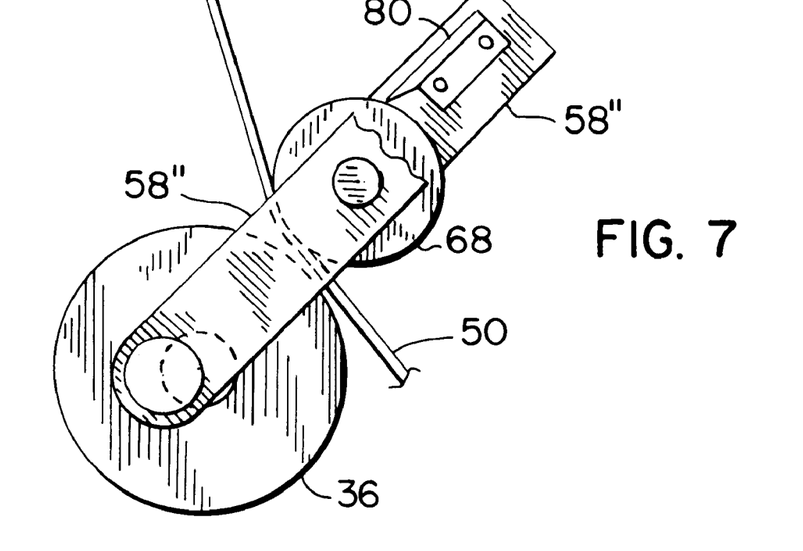
FIGS. 7 and 8 are views similar to FIGS. 5 and 6, respectively, showing another alternate embodiment of the invention in starting and finish positions, respectively.
Figure 8:
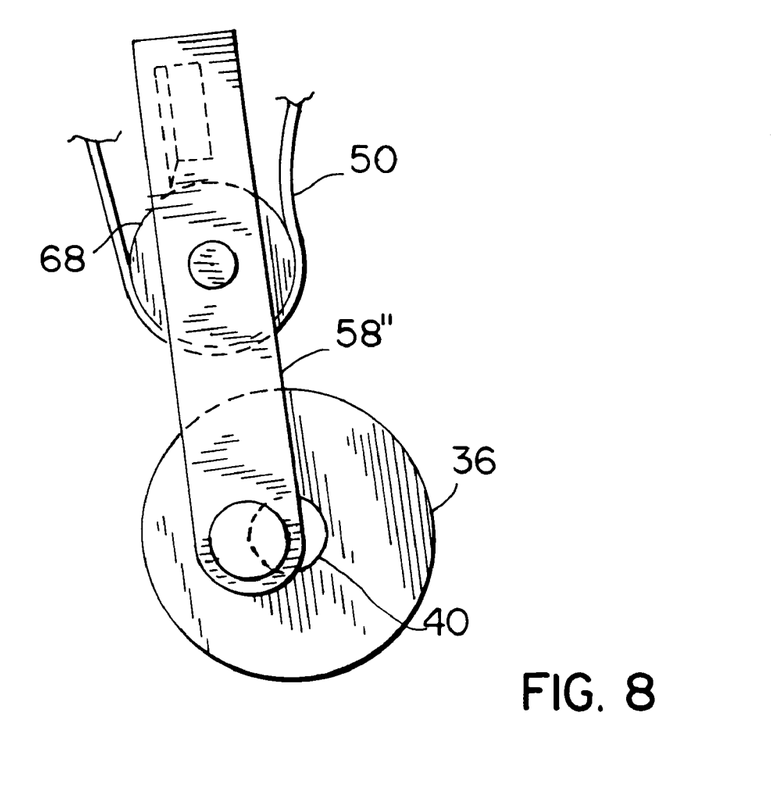

FIGS. 7 and 8 illustrate an alternatively embodiment similar to the embodiment shown in FIGS. 5 and 6, respectively. In the embodiment of FIGS. 7 and 8, first guide roller 68 is mounted between a pair of link members 58" which include outer end portions extending beyond the periphery of guide roller 68. The inner ends of link members 58" are mounted eccentricly relative to the longitudinal axis of stripping roller 36, such that the pivot axis of link members 58" is offset forwardly relative to the longitudinal axis of stripping roller 36. As in the prior embodiments, link members 58" are pivotable in an upward and forward direction as the bale grows within bale forming chamber 22, between the starting position of FIG. 7 and the finish position of FIG. 8. Due to the eccentric mounting of link members 58" relative to stripping roller 36, the surface of first guide roller 68 is in a closely spaced relationship relative to the outer surface of stripping roller 36 when link members 58" are in their starting position of FIG. 7. As link members 58" are pivoted to their finish position of FIG. 8, the distance between the outer surface of first guide roller 68 and the outer surface of stripping roller 36 gradually increases until link members 58" reach their finish position of FIG. 8. With this arrangement, belts 50 are maintained close to stripping roller 36 during initial bale formation, to prevent crop material from passing between belts 50 and roller 36. When the bale has grown and link members 58 are pivoted to their position of FIG. 8, the space between belts 50 and stripping roller 36 is increased, thus providing relief to allow trash to escape which may be caught between guide roller 68 and belts 50.

In addition, link members 58" are constructed such that a scrapper blade 80 is mounted to the portion of link members 58 outwardly of guide roller 68. Scrapper 80 has an inner end located in close proximity to first guide roller 68, and functions to remove any crop material which may adhere to the surface of first guide roller 68. The crop material scrapped from first guide roller 68 falls by gravity through the spaces between belts 50 and is subsequently incorporated into the bale.

Any of the embodiments of the invention are usable in combination with other bale density control systems, such as a hydraulic cylinder system, to control the tension of belts 50 and thereby the density of the bale.

It should be readily appreciated that the present invention provides an improved open throat round baler which eliminates the need for an independent packing or compression mechanism used in forming round bales. Further, while the invention has been shown and described in connection with an open throat baler, it is understood the invention can also be used for balers other than those having an open throat design, such as a baler incorporating a packing roll for facilitating bale formation. The invention provides a simple but effective, automatically shiftable tensioning device which cooperates with the baler belts adjacent a roller to vary the tension of the bale forming belts throughout bale formation so as to ensure a tightly formed bale and to maintain the baler belts in a predetermined relationship relative to a roller, such as a stripping roller, during bale growth. Unlike prior art devices, the belt tensioning device of the present invention is not dependent on complex belt engaging arms or activating springs, and such simplified design contributes to the improved economy in producing and servicing the baler.

While the invention has been described with reference to a preferred embodiment, those skilled in the art will appreciate that certain substitutions, alterations and omissions may be made without departing from the spirit thereof. Accordingly, the foregoing description is meant to be exemplary only, and should not be deemed limitative on the scope of the invention set forth with following claims.

I claim:

1. A round baler for forming round bales of crop material comprising:
   a plurality of side-by-side belts trained for movement between a starting position and a finish position around a plurality of stationary rollers including a pair of spaced stationary baler rollers;
   an upper roller continuously engageable with the crop material;
   a lower roller continuously engageable with the crop material;
   said upper roller, said lower roller, and a run of said belts extending between said pair of spaced stationary baler rollers together defining a bale forming chamber; and
   a variable belt tensioning arrangement movably mounted to one of said upper and lower rollers and interposed between said pair of spaced stationary baler rollers, wherein said variable belt tensioning arrangement is engaged with said belts and movable in response to growth of a bale within said bale forming chamber to vary the tension of said belts between said pair of spaced stationary baler rollers as said belts move from said starting position to said finish position in response to bale growth.

2. The baler of claim 1, wherein said belt tensioning device is movable in a forward direction during bale formation.

3. The baler of claim 1, wherein said variable bale tensioning arrangement is located outside said bale forming chamber.

4. The baler of claim 1, wherein said variable belt tensioning arrangement includes a first guide roller entrained with said belts, and a second guide roller entrained with said belts and spaced from said first guide roller.

5. The baler of claim 4, wherein said first guide roller and second guide roller are both mounted above said upper roller.

6. A round baler for forming round bales of crop material comprising:
   a plurality of side-by-side belts trained for movement between a starting position and a finish position around a plurality of stationary rollers including a pair of spaced stationary baler rollers;
   an upper roller arrangement continuously engageable with the crop material, wherein said upper roller arrangement comprises a stripping roller, and an initial bale forming roller located parallel to, beneath, and forwardly of said stripping roller;
   a lower roller arrangement continuously engageable with the crop material;
   said upper roller arrangement, said lower roller arrangement, and a run of said belts extending between said pair of spaced stationary baler rollers together defining a bale forming chamber: and
   a belt tensioning device interposed between said pair of spaced stationary baler rollers to vary the tension of said belts between said starting position and said finish position in response to bale growth.

7. A round baler for forming round bales of crop material comprising:
   a plurality of side-by-side belts trained for movement between a starting position and a finish position around a plurality of stationary rollers including a pair of spaced stationary baler rollers;
   an upper roller arrangement continuously engageable with the crop material, said upper roller arrangement including a stripper roller;
   a lower roller arrangement continuously engageable with the crop material;
   said upper roller arrangement, said lower roller arrangement, and a run of said belts extending between said pair of spaced stationary baler rollers together defining a bale forming chamber; and
   a belt tensioning device interposed between said pair of spaced stationary baler rollers to vary the tension of said belts between said starting position and said finish position in response to bale growth, wherein said belt tensioning device comprises a bracket having at least two ends; at least one guide roller mounted toward a first one of said bracket ends; and wherein a second one of said bracket ends is pivotably mounted to said stripping roller.

8. The baler of claim 7, wherein said at least one guide roller is mounted above said stripping roller.

9. The baler of claim 7, wherein said at least one guide roller is solely supported against said belts on said stripping roller.

10. A round baler for forming round bales of crop material comprising:
    a plurality of side-by-side belts trained for movement between a starting position and a finish position around a plurality of stationary rollers including a pair of spaced stationary baler rollers:
    an upper roller arrangement continuously engageable with the crop material;
    a lower roller arrangement continuously engageable with the crop material;
    said upper roller arrangement, said lower roller arrangement, and a run of said belts extending between said pair of spaced stationary baler rollers together defining a bale forming chamber; and
    a belt tensioning device interposed between said pair of spaced stationary baler rollers to vary the tension of said belts between said starting position and said finish position in response to bale growth, wherein said belt tensioning device is independent of tensioning springs.

11. A round baler for forming round bales of crop material comprising:
   a plurality of side-by-side belts trained for movement between a starting position and a finish position around a plurality of stationary rollers including a pair of spaced stationary baler rollers;
   an upper roller arrangement continuously engageable with the crop material;
   a lower roller arrangement continuously engageable with the crop material, wherein said lower roller arrangement comprises a single floor roller mounted rearwardly of said upper roller arrangement;
   said upper roller arrangement, said lower roller arrangement, and a run of said belts extending between said pair of spaced stationary baler rollers together defining a bale forming chamber; and
   a belt tensioning device interposed between said pair of spaced stationary baler rollers to vary the tension of said belts between said starting position and said finish position in response to bale growth.

12. A round baler for forming round bales of crop material comprising:
   a plurality of side-by-side belts trained for movement between a starting position and a finish position around a plurality of stationary rollers including a pair of spaced stationary baler rollers;
   an upper roller arrangement continuously engageable with the crop material;
   a lower roller arrangement continuously engageable with the crop material;
   wherein said upper roller arrangement and said lower roller arrangement are rotatable in the same direction;
   said upper roller arrangement, said lower roller arrangement, and a run of said belts extending between said pair of spaced stationary baler rollers together defining a bale forming chamber; and
   a belt tensioning device interposed between said pair of spaced stationary baler rollers to vary the tension of said belts between said starting position and said finish position in response to bale growth.

13. In a round baler for forming round bales of crop material and having a plurality of side-by-side belts trained about a series of baler rollers for movement between a starting position and a finish position, an upper roller arrangement and a lower roller arrangement, both of said roller arrangements being engageable with the crop material and cooperable with a run of said belts to define a bale starting chamber, the improvement comprising a mechanism for tensioning said belts between the starting position and finish position, and comprising:
   a bracket pivotably mounted to one of said roller arrangements; and
   at least one guide roller mounted on said bracket and entrained with said belts;
   wherein said at least one guide roller is shiftable in response to bale growth during bale formation to maintain said belts in a predetermined position relative to said roller arrangement.

14. The improvement of claim 13, including a second guide roller mounted on said bracket in spaced relationship to said at least one guide roller and engageable with said belts to increase the tension on said belts in response to bale growth.

15. The improvement of claim 13, wherein said bracket is constructed and arranged to maintain said belts in close proximity to said upper roller arrangement.

16. The improvement of claim 13, wherein said at least one guide roller is located between a pair of said baler rollers.

17. The improvement of claim 13, wherein said guide roller is located adjacent a roll in said roller arrangement, and wherein the diameter of said guide roller is less than the diameter of said roll in said roller arrangement.

18. The improvement of claim 13, further comprising a scraper member mounted to the bracket and including a scraping surface located in close proximity to the at least one guide roller.

19. In a round baler roller for forming round bales of crop material and having a plurality of side-by-side belts trained about a series of stationary baler rollers for movement between a starting position and a finish position, a driven stripping roller and a driven floor roller, both of said driven rollers being engageable with the crop material and cooperable with a run of said belts to define a bale starting chamber, the improvement residing in a mechanism for tensioning said belts between the starting position and finish position and comprising:
   a bracket pivotably mounted to said stripping roller;
   a first guide roller mounted on said bracket and engageable with said belts;
   a second guide roller mounted on said bracket in spaced relationship from said first guide roller and engageable with said belts;
   wherein said first guide roller and said second guide roller are pivotable with respect to said stripping roller in response to bale growth during bale formation to vary the tension on said belts.

20. The improvement of claim 19, wherein said bracket is V-shaped and has a first leg and a second leg diverging from a common intersection thereon.

21. The improvement of claim 20, wherein said first guide roller is mounted for rotation at said common intersection, said second guide roller is mounted for rotation on said first leg, and wherein said second leg is pivotably mounted to said stripping roller to pivotably mount said bracket to said stripping roller.

22. A round baler, comprising:
   a movable tensioned belt arrangement;
   at least one roller located adjacent the belt arrangement and adjacent a crop inlet defined by the round baler, wherein the movable belt arrangement and the at least one roller together define a bale forming chamber;
   wherein the belt arrangement is movable between a starting position and a finish position in response to bale growth within the bale forming chamber; and
   a belt tensioning device interconnected with the at least one roller and engaged with the movable belt arrangement and operable to increase the tension of the belt arrangement in response to movement of the belt arrangement from its starting position toward its finish position.

23. In a round baler including a roller and a movable tensioned belt arrangement which cooperate to at least in part define a bale forming chamber for receiving crop material from a crop inlet associated with the baler, wherein the belt arrangement is movable between a starting position and a finish position to vary the size of the bale forming chamber in response to bale growth, the improvement comprising a variable belt tensioning device interconnected with the roller and engaged with the belt arrangement and operable to provide an increasing tension on the belt arrangement as the belt arrangement moves from its starting position toward its finish position.

24. In a round baler including an interior containing a movable belt arrangement and at least one roller which is located adjacent the belt arrangement and cooperates with the belt arrangement to at least in part define a bale forming chamber, wherein the belt arrangement is movable between a starting position and a finish position in response to bale growth within the bale forming chamber, the improvement comprising a belt tensioning member disposed within the interior of the round baler and engaged with the belt arrangement, wherein the belt tensioning member is operable to increase the tension of the belt arrangement in response to movement of the belt arrangement from its starting position toward its finish position.

* * * * *